(12) United States Patent
Ninomiya et al.

(10) Patent No.: US 10,107,629 B2
(45) Date of Patent: Oct. 23, 2018

(54) INFORMATION PROCESSING SYSTEM, INFORMATION PROCESSING METHOD, AND NON-TRANSITORY COMPUTER READABLE STORAGE MEDIUM

(71) Applicant: YAHOO JAPAN CORPORATION, Tokyo (JP)

(72) Inventors: Kazuhiro Ninomiya, Tokyo (JP); Shinsuke Sato, Tokyo (JP); Miyuki Watanabe, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 13 days.

(21) Appl. No.: 15/224,879

(22) Filed: Aug. 1, 2016

(65) Prior Publication Data
US 2017/0082440 A1 Mar. 23, 2017

(30) Foreign Application Priority Data
Sep. 18, 2015 (JP) .................................. 2015-185294

(51) Int. Cl.
G01C 21/20 (2006.01)
G01C 21/16 (2006.01)
G01C 21/08 (2006.01)

(52) U.S. Cl.
CPC ........... *G01C 21/206* (2013.01); *G01C 21/16* (2013.01); *G01C 21/08* (2013.01)

(58) Field of Classification Search
CPC ....... G01C 21/206; G01C 21/16; G01C 21/08
See application file for complete search history.

(56) References Cited

U.S. PATENT DOCUMENTS

| 6,643,584 | B1* | 11/2003 | Ikeuchi | G01C 21/32 340/988 |
| 9,955,359 | B2* | 4/2018 | Monaghan | H04W 16/20 |
| 9,958,250 | B2* | 5/2018 | Reilio | G01B 7/004 |
| 2003/0195008 | A1* | 10/2003 | Mohi | G01C 21/20 455/456.5 |
| 2009/0051894 | A1* | 2/2009 | Shibazaki | G03F 7/70725 355/72 |

(Continued)

FOREIGN PATENT DOCUMENTS

| JP | H06-180236 A | 6/1994 |
| JP | H09-113596 A | 5/1997 |

(Continued)

OTHER PUBLICATIONS

Jun. 19, 2017 Office Action issued in Japanese Patent Application No. 2015-185294.

(Continued)

*Primary Examiner* — Frederick M Brushaber
(74) *Attorney, Agent, or Firm* — Oliff PLC

(57) ABSTRACT

An information processing system according to the present application comprises a user terminal and a server apparatus, the user terminal including a magnetic field measuring unit that measures magnetic fields, a movement measuring unit that measures manners of movement, and an output unit that outputs the measured magnetic fields and results of the measurement performed by the movement measuring unit while associating each of the measured magnetic fields and a corresponding one of the measurement results with each other.

20 Claims, 10 Drawing Sheets

(56) References Cited

U.S. PATENT DOCUMENTS

| | | | |
|---|---|---|---|
| 2012/0059623 A1* | 3/2012 | Sambongi | G01C 21/005 702/150 |
| 2013/0040682 A1* | 2/2013 | Chang | H01Q 1/243 455/517 |
| 2013/0080120 A1* | 3/2013 | Venkatesh | G01C 21/206 703/1 |
| 2013/0253821 A1* | 9/2013 | Joseph | G01C 17/38 701/501 |
| 2013/0253880 A1* | 9/2013 | Joseph | G01C 19/5776 702/150 |
| 2013/0338961 A1* | 12/2013 | Youssef | G01C 21/005 702/141 |
| 2014/0155098 A1* | 6/2014 | Markham | H04B 1/0064 455/456.3 |
| 2014/0274114 A1* | 9/2014 | Rowitch | H04W 4/029 455/456.1 |
| 2014/0309963 A1* | 10/2014 | Tsukamoto | G01C 21/12 702/150 |
| 2014/0312884 A1* | 10/2014 | Reilio | B66B 1/3492 324/207.11 |
| 2014/0343846 A1* | 11/2014 | Goldman | G05D 1/0272 701/525 |
| 2015/0281910 A1* | 10/2015 | Choudhury | G01S 5/021 455/456.1 |
| 2015/0285637 A1* | 10/2015 | Kelly | G01C 21/12 701/430 |
| 2016/0252354 A1* | 9/2016 | Georgy | G01C 21/165 701/500 |
| 2016/0345148 A1* | 11/2016 | Johnson | H04W 4/02 |
| 2017/0031925 A1* | 2/2017 | Mishra | G06F 17/30061 |
| 2017/0057518 A1* | 3/2017 | Finegold | B60W 40/09 |
| 2017/0343353 A1* | 11/2017 | Mahmoud | G01C 21/16 |
| 2018/0112983 A1* | 4/2018 | Ahmed | G01C 21/005 |

FOREIGN PATENT DOCUMENTS

| | | |
|---|---|---|
| JP | 2002-159742 A | 6/2002 |
| JP | 2011-528438 A | 11/2011 |
| JP | 2012-202787 A | 10/2012 |
| JP | 2012-215547 A | 11/2012 |
| JP | 2013-76671 A | 4/2013 |
| JP | 2015-97007 A | 5/2015 |
| WO | 2010/009104 A1 | 1/2010 |

OTHER PUBLICATIONS

Nov. 6, 2017 Office Action issued in Japanese Patent Application No. 2015-185294.

* cited by examiner

INFORMATION PROCESSING SYSTEM, INFORMATION PROCESSING METHOD, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2015-185294 filed in Japan on Sep. 18, 2015.

BACKGROUND OF THE INVENTION

1. Field of the Invention

The present invention relates to a technique for generating, by use of a terminal employing movement measurement for navigation such as dead reckoning, a map in which corresponding pieces of map data and geomagnetic data are associated with each other.

2. Description of the Related Art

Conventionally, location positioning for places out of reach of Global Positioning System (GPS) radio waves has been developed that is based on geomagnetism, which varies in different locations on the earth (for example, see Japanese Patent Application No. 2012-202787).

For places to be covered in such geomagnetism-based location positioning, however, there is the need for advance preparation of data for comparison obtained by actually measuring place-by-place geomagnetism and changes thereof due to traveling. In addition, map data that represents places such as hallways and spaces that are inside buildings and passable by people needs to be prepared in advance in association with corresponding geomagnetic data. Such advance preparation of data involves a large burden including the labor cost of a large number of workers who visit the actual places. In particular, the application of the developed technique to a large number of stations and buildings and to a broad area such as a large country has been unrealistic because advance preparation of data therefor involves a huge burden.

SUMMARY OF THE INVENTION

It is an object of the present invention to at least partially solve the problems in the conventional technology.

An information processing system according to the present application comprises a user terminal and a server apparatus, the user terminal including a magnetic field measuring unit that measures magnetic fields, a movement measuring unit that measures manners of movement, and an output unit that outputs the measured magnetic fields and results of the measurement performed by the movement measuring unit while associating each of the measured magnetic fields and a corresponding one of the measurement results with each other.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes embodiments of the present invention with reference to the accompanying drawings. These embodiments are not intended to limit the present invention, and the present invention can be carried out in various manners without departing from the scope thereof.

1. Functional Configuration 1-1. Modules for Implementation Functions

Figure 1:
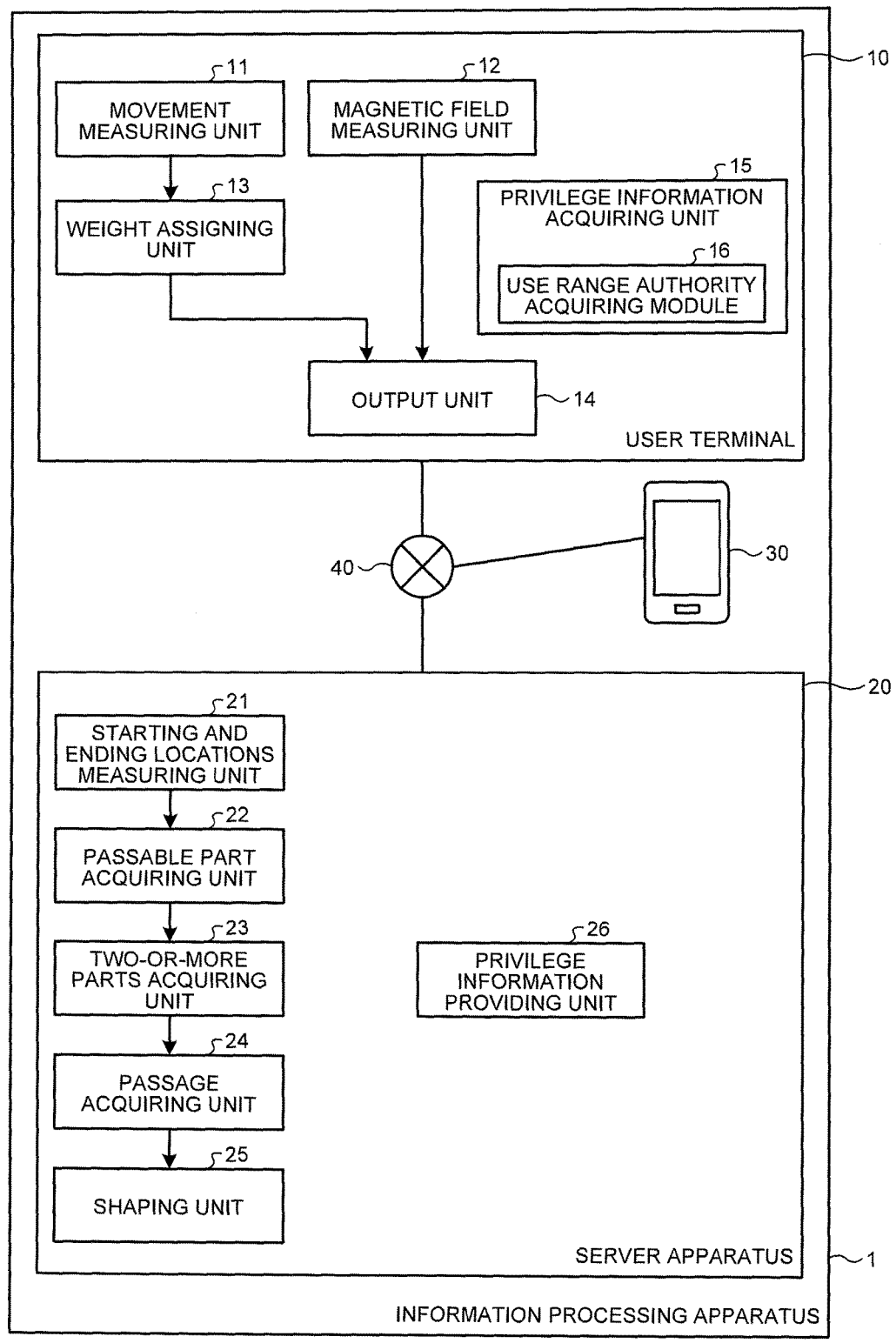
FIG. 1 is a block diagram illustrating an example of functional blocks of an information processing apparatus in one embodiment according to the present invention.

FIG. 1 is a block diagram illustrating an example of functional blocks of an information processing apparatus in one embodiment according to the present invention. Each of the functional blocks of the present apparatus described below is implemented as a combination of hardware and software. Specifically, in the case of using a computer, examples of components in the combination include: hardware component units such as a central processing unit (CPU), a main memory, a system bus, a secondary storage device (such as a hard disk drive, a non-volatile memory, or a combination of storage media (such as a compact disc (CD) and a digital versatile disc (DVD)) and a drive for reading the media), an input device that is utilized for inputting information, a display apparatus, and an external peripheral apparatus other than the foregoing apparatuses; an interface for the external peripheral apparatus; an interface for communication; driver programs for controlling such pieces of hardware; other application programs; and an application for a user interface. In particular, components that can be included as hardware related to a movement measuring unit 11 include a gyro sensor, an acceleration sensor, a geographic radio-frequency RF tag reader, a current location recognizer employing image recognition, and an apparatus that recognizes a current location by infrared wireless communication or other near field communication.

In this case, the CPU performs arithmetic processing in accordance with a computer program loaded on the main memory, and the arithmetic processing results in: processing and accumulation of data and the like that are input from the input device and other devices such as an interface and retained on a memory or a hard disk; and generation of instructions for controlling the above respective pieces of hardware and software. The functional block of the present apparatus may be implemented as dedicated hardware. The present apparatus is not limited to being configured in the form of a single piece of hardware or software, and may be configured in the form of a plurality of pieces of hardware and/or software or be configured so as to include a server apparatus across a network.

The present invention not only can be implemented as an apparatus but also can be implemented as a method. Furthermore, a part of this invention can be configured as software. Obviously, the technical scope of this invention includes a computer program for use in causing a computer to execute the software, and a recording medium in which the computer program is retained (the same applies to all through the entirety of the present specification).

1-2. Components for Functions to be Implemented

As illustrated in FIG. 1, an information processing apparatus 1 in this embodiment includes a user terminal 10 and a server apparatus 20 that can be connected to the user terminal 10 via a network 40. A plurality of user terminals (a user terminal 30, a user terminal n (not illustrated), and so on) may be connected to the server apparatus 20. The information processing apparatus in this embodiment can be read also as an information processing system; and a unit serving as a component of the present information processing apparatus can be read also as a module.

The user terminal 10 includes a movement measuring unit 11, a magnetic field measuring unit 12, a weight assigning unit 13, an output unit 14, and a privilege information acquiring unit 15. The server apparatus 20 includes a starting and ending locations acquiring unit 21, a passable part acquiring unit 22, a two-or-more parts acquiring unit 23, a passage acquiring unit 24, a shaping unit 25, and a privilege information providing unit 26. Not only an invention made with all of the above components included therein, but also an invention made with some of the above components included therein are applicable as an invention represented by this embodiment.

The movement measuring unit 11 functions to measure manners of movement. The term "manner of movement" refers to a manner in which the user terminal 10 that includes the movement measuring unit 11 moves. This term means, for example, an instantaneous acceleration, a speed, a direction, and change in location based on these acceleration, speed, and direction. Examples of tools for measuring manners of movement include: sensors such as an acceleration sensor, a gyro sensor, and a direction finder; GPS; an Indoor Messaging System (IMES); near field communication techniques; and wireless LAN positioning techniques. The movement measuring unit 11 may includes a plurality of modules (movement measuring modules) for measuring manners of movement.

When the movement measuring unit 11 includes a plurality of movement measuring modules, the weight assigning unit 13 assigns weights to measurement results obtained from these movement measuring units depending on the respective movement measuring modules. The weight assignment is, for example, performed in accordance with measurement accuracy and reliability of the respective movement measuring modules. For example, when positioning modules based on an acceleration sensor and a wireless LAN are included as the movement measuring modules, a weight of "0.8" or the like of a weight assigned to a measurement result from the acceleration sensor is assigned to a measurement result from the wireless LAN based positioning module. The weight assigning unit 13 may be included in the server apparatus 20.

The magnetic field measuring unit 12 functions to measure magnetic fields. Although it is assumed herein that the magnetic fields to be measured are attributable to geomagnetism, a place-specific factor that generates a magnetic field exists other than geomagnetism and is relatively invariable. Therefore, a magnetic field attributable to such a location-specific magnetic-field generating factor is also to be measured while being superimposed on a magnetic field attributable to geomagnetism. Examples of a location-specific magnetic-field generating factor not only include factors that actively generate magnetic fields, such as a high-voltage power cable, a mobile phone base station, a large-scale apparatus using electricity, a train power cable, and a power generation and transmission facility, but also include factors that affect magnetic fields, such as a reinforcing bar in a reinforced concrete building, a material for a component of an iron bridge, an iron post of a traffic light, an iron fence, and an iron door.

A magnetic field is a vector quantity. Therefore, at least three components are used for expressing a magnetic field at one place. For example, a magnetic field at one place can be expressed by measuring such components as declination, inclination, and a horizontal component. Examples of a specific tool for measuring a magnetic field include an electronic compass equipped with a three-axis magnetic sensor. Another electronic compass further equipped with an acceleration sensor is available. Thus, the functions of the movement measuring unit 11 and the magnetic field measuring unit 12 may be implemented by a single specific tool.

The output unit 14 outputs measured magnetic fields and measurement results from the movement measuring unit 11 while associating each of the magnetic fields with the corresponding measurement result or results. For example, each of the magnetic fields measured with reference to time are associated with the corresponding measurement result or results obtained by the movement measuring unit 11 with reference to time. This association enables association between a manner of movement of the user terminal 10 at one time point and a magnetic field at a place where the manner of movement has been taken. Thus, location change of the user terminal 10 as a result of movement thereof and magnetic fields at various locations in the location change can be acquired.

Figure 8:
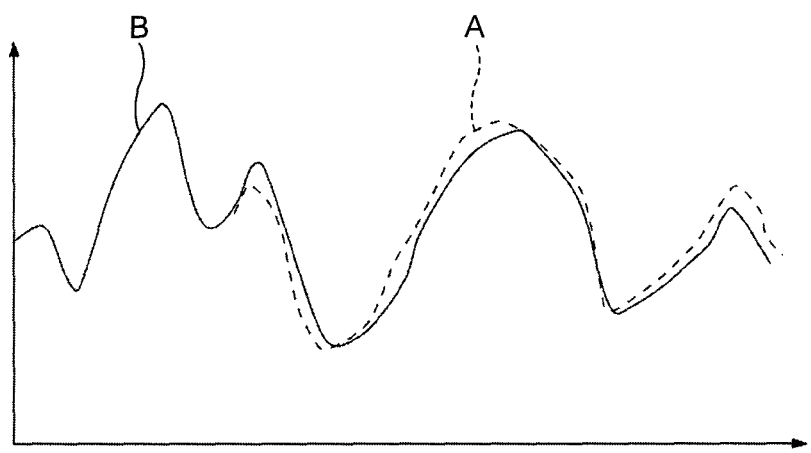
FIG. 8 is a conceptual diagram illustrating an example of geomagnetic data.

Map data on the inside of an area covered by geomagnetism-based location positioning, and geomagnetic data representing change in magnetic field at each location in the map data are stored in a certain service-purpose server apparatus, and are provided to geomagnetism-based location positioning (herein referred to as a "service"). That is, the service-purpose server receives, from a terminal attempting to identifying a location that is not within the GPS range, such as an underground location, changes in magnetic field that are measured at time points during the attempt (for example, the dashed line A in FIG. 8) and compare these changes with the geomagnetic data. The service-purpose server thus sets the estimated location of the terminal to a location in the map data that is associated with a piece of the geomagnetic data (for example, the solid line B in FIG. 8) that best approximates the changes most is The estimated location is returned to the terminal, and are utilized for such purposes as display of a map and routing assistance. The geomagnetic data may be represented as magnetic field strength in three axes (the x-axis, the y-axis, and the z-axis) at a certain location.

The starting and ending locations acquiring unit 21 acquires a measurement starting location and a measurement ending location. For example, a location at which reception of GPS radio waves has stopped (such as the last location that GPS has been able to identify before that) is acquired as the measurement starting location. A location at which reception of GPS radio waves has restarted (such as a location that GPS has been able to identify through the reception having restarted) is acquired as the measurement ending location.

The passable part acquiring unit 22 functions to acquire, as a passable part, a line (for example, a polyline) obtained by connecting together locations that have been acquired in the user terminal 10 based on measurement results from measurement performed by the movement measuring unit 11 while the user terminal 10 moves from the measurement starting location to the measurement ending location. The locations forming this line can be acquired by, for example, performing certain arithmetic operations based on measurement results from a three-axis acceleration sensor while using the measurement starting location acquired by GPS as a reference.

1-3. Examples of Measurement

Figure 2:
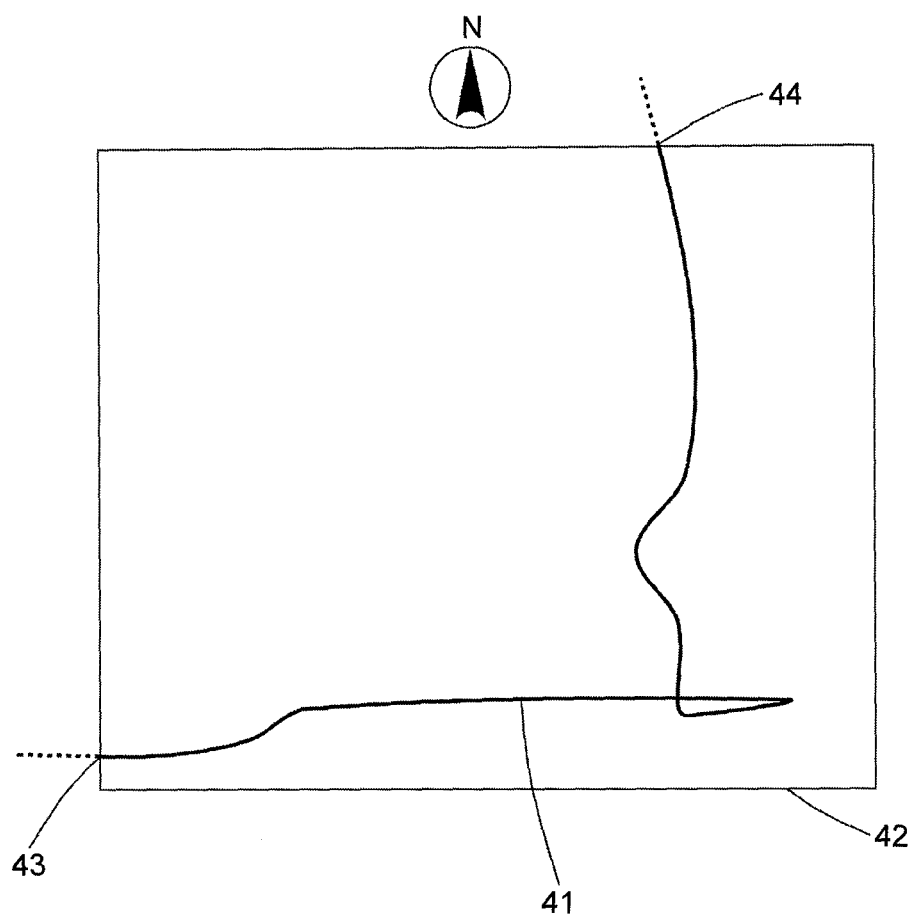
FIG. 2 is a conceptual diagram illustrating an example of a passable part acquired by a passable part acquiring unit.

FIG. 2 is a conceptual diagram illustrating the passable part acquired by the passable part acquiring unit 22. The compass direction in the illustration is intended for the convenience of explanation. The line obtained by connecting together locations acquired based on measurement results from measurement performed by the movement measuring unit 11 is depicted as a solid line 41 in the illustration. A rectangular box 42 in the illustration indicates the contour of a building.

The user terminal 10 enters the building from the south west corner of the building (dotted line). Reception of GPS radio waves stops from this place 43, which is acquired as the measurement starting location. The line obtained by connecting together locations acquired based on subsequent measurement results is the solid line in the illustration. This solid line goes eastward after the entrance into the building, turns around to go a short distance westward, and then takes the northward direction to go out from the building. Reception of GPS radio waves restarts at a location where the line comes out from the building, and this place 44 is acquired as the measurement ending location. The line thus obtained is acquired as the passable part. The same applies to the case where weights have been assigned to the measurement results from the movement measuring unit 11 by the weight assigning unit 13.

Here, each of the measurement results from the movement measuring unit 11 that are utilized in the acquisition of the passable part is associated with the corresponding measurement result from the magnetic field measuring unit 12. The respective locations forming the passable part are thus associated with magnetic fields at the respective locations. The passable part associated with the magnetic fields constitutes map data associated with magnetic field. That is, the passable part or an aggregate of the passable parts constitutes map data (hereinafter referred to also as a magnetic field correspondence indoor map) associated with magnetic fields for providing, in indoor places out of reach of GPS radio waves, navigation based on magnetic fields as a service to a mobile terminal or the like capable of measuring magnetic fields. A passable part, a passage, and an aggregate of passable parts or passages to be described later also constitute the magnetic field correspondence indoor map.

Alternatively, the passable part acquiring unit 22 may acquire, as a passable part, a certain range obtained with reference to locations that have been acquired in the user terminal 10 based on measurement results from measurement performed by the movement measuring unit 11 while the user terminal 10 moves from the measurement starting location to the measurement ending location.

Figure 3:
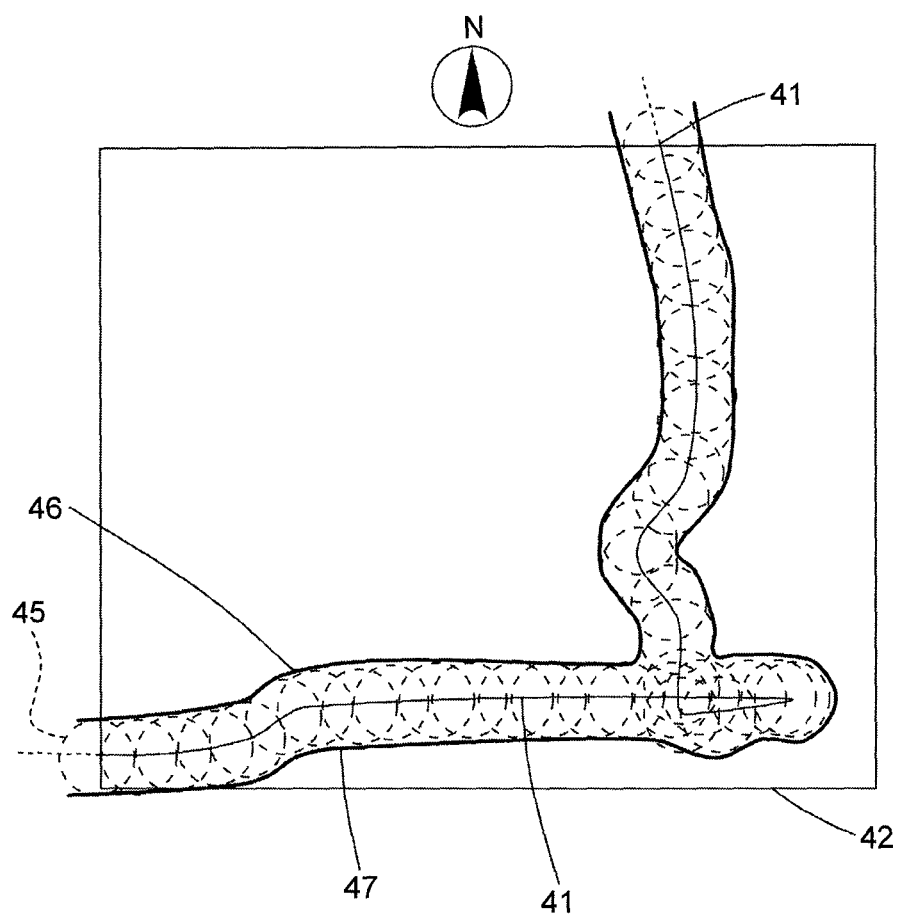
FIG. 3 is a conceptual diagram illustrating another example of a passable part acquired by the passable part acquiring unit.

FIG. 3 is a conceptual diagram illustrating an example in which the aforementioned certain range is acquired as a passable part. Circles 45 (the circles drawn with dashed lines) having a certain diameter and having their respective centers at the locations acquired based on the measurement results illustrated in the example of FIG. 2 are connected together, and a region between lines 46 and 47 that are along outside edges of the connected circles is acquired as the passable part.

The two-or-more parts acquiring unit 23 functions to acquire a plurality of passable parts acquired by the passable part acquiring unit 22. The passable parts acquired by the two-or-more parts acquiring unit 23 may be a plurality of passable parts acquired based on measurement results output from one user terminal, or may be a plurality of individual passable parts collectively acquired based on measurement results output from a plurality of user terminals.

Figure 4:
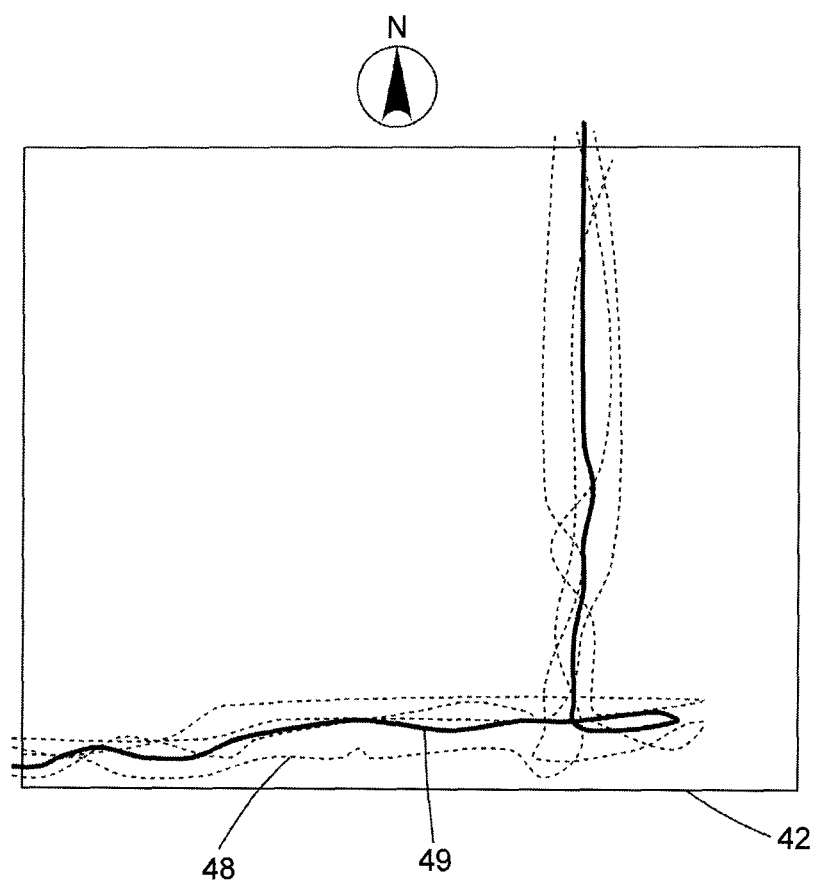
FIG. 4 is a conceptual diagram illustrating an example of a passage acquired by a passage acquiring unit.

The passage acquiring unit 24 functions to acquire a single passage based on a plurality of passable parts acquired by the two-or-more parts acquiring unit 23. FIG. 4 is a conceptual diagram illustrating an example of the passage acquired by the passage acquiring unit 24. As illustrated, four passable parts acquired as lines indicated by dotted lines 48 have been acquired by the two-or-more parts acquiring unit 32. The passage acquiring unit 24 then acquires a single passage 49 by, for example, averaging the four passable parts. As an alternative to the averaging, processing for acquiring the single passage may be acquisition by finding the centroids of the respective passable parts or may be acquisition that reflects the variance and/or the standard deviation of the respective passable parts. Acquisition of a single passage based on a plurality of passable parts makes it possible to highly accurately acquire a passage that is passable and that involves smaller errors than the individual passable parts. Alternatively, as illustrated in FIG. 3, a plurality of passable parts having a width may be acquired to acquire a single passage. A single passage is acquired in a similar manner also in the case where each passable part is acquired based on measurement results to which weights have been assigned by the weight assigning unit 13.

It is preferable that the passable parts acquired be configured so as to include passable parts the directions of which are opposite to each other. For example, in the examples illustrated in FIG. 2 to FIG. 4, passable parts acquired for acquiring the single passage are configured to include a passable part for which a measurement starting location is set at a north east door of the rectangular box 42 and a measurement ending location is set in the south west corner thereof. It is often the case that, in a public passage or the like, a side on which passing is allowed is either the right side or the left side relative to the direction of travel. Therefore, the single passage is acquired after a plurality of oppositely directed passable parts are acquired, so that a highly accurate passage that better approximates the reality can be acquired.

The shaping unit 25 functions to shape the passage acquired by the passage acquiring unit 24. For example, the passage acquired is shaped into rectangles. It is often the case that an actual passage in a building is formed substantially as a combination of straight lines and right angles. For this reason, the passage acquired by the passage acquiring unit 24 is shaped so as to correspond to an actual passage.

Figure 5:
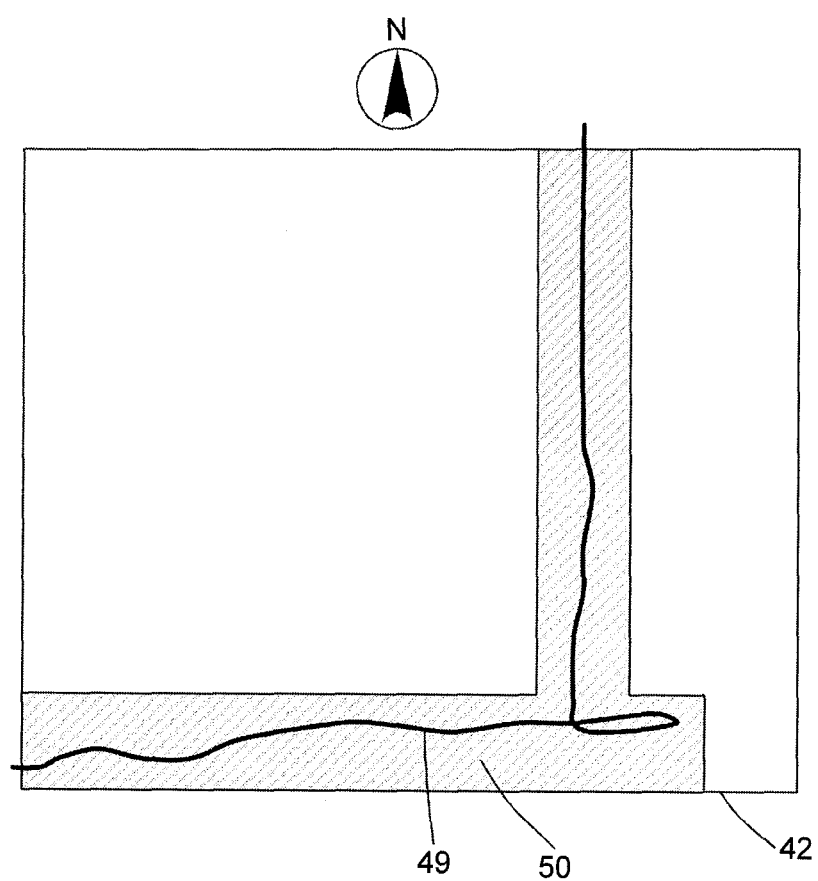
FIG. 5 is a conceptual diagram illustrating an example in which the passage has been shaped.

FIG. 5 is a conceptual diagram illustrating an example in which the passage illustrated in FIG. 4 has been shaped. As illustrated, the passage 49 acquired by the passage acquiring unit 24 is shaped by the shaping unit 25 into rectangles, so that the passage 50 (the shaded area in the illustration) can be acquired in a form considered likely in an actual building.

1-4. Examples of Incentive

The privilege information providing unit 26 functions to provide privilege information, which is information on privileges, in accordance with measurement results (for example, the amount of measuring movement) from the movement measuring unit. The functions of the magnetic field measuring unit 12, the movement measuring unit 11, and the output unit 14 included in the user terminal 10 can be implemented by, for example, installation and execution of an application distributed by the server apparatus 20. In such a case, the application is executed by the user terminal 10, so that the server apparatus 20 can acquire passable parts and a passage by acquiring: pieces of magnetic field data that are output from the user terminal 10 and that are associated with one another; and measurement results from the movement measuring unit 11. The server apparatus 20 is capable of: generating the aforementioned magnetic field correspondence indoor map, based on passable parts and a passage that have been acquired; and providing, as a service, navigation according to the magnetic field correspondence indoor map to mobile and other terminals (including a user terminal 10) capable of measuring magnetic fields.

Given this situation, the server apparatus 20 is configured to grant privileges to the user terminal 10 that provides thereto information that contributes to the service provision, and provides a piece of privilege information, which is pieces of information for the respective privileges. This piece of the privilege information depends on measurement results from the movement measuring unit, and depends on, for example, how large or small the amount of measurement results is, and whether locations covered by the measurement are various in a far-reaching region, and so on. That is, a larger amount of measurement results contributes to a higher accuracy of a passable part acquired, and measurement results at various places contribute to generation of map data; hence a reasonable privilege is granted to the corresponding user terminal. With regard to acquisition of the privilege information, the privilege information may be acquired depending on the accumulated amount of measurement results that has been output thus far, or may be acquired depending on the amount of measurement results in a given time period (such as one month).

The user terminal 10 includes a privilege information acquiring unit 15 configured to acquire a piece of the privilege information, which are pieces of information for privileges as described above, depending on measurement results from the movement measuring unit.

When the user terminal 10 is using a navigation service based on the magnetic field correspondence indoor map, the privilege may be, for example, enlarging an area in which the navigation service is available (use-authorized range) depending on measurement results (a use range authority acquiring module 16). Granting the use range authority depending on measurement results serves as an incentive for outputting measurement results from the user terminal 10, thereby enabling the server apparatus 20 to improve and expand the magnetic field correspondence indoor map.

Such privileges as described above are built on the utilization of a characteristic of geomagnetism-based location positioning that the positioning depends on a server unlike GPS.

2. Hardware Composition

Figure 6:
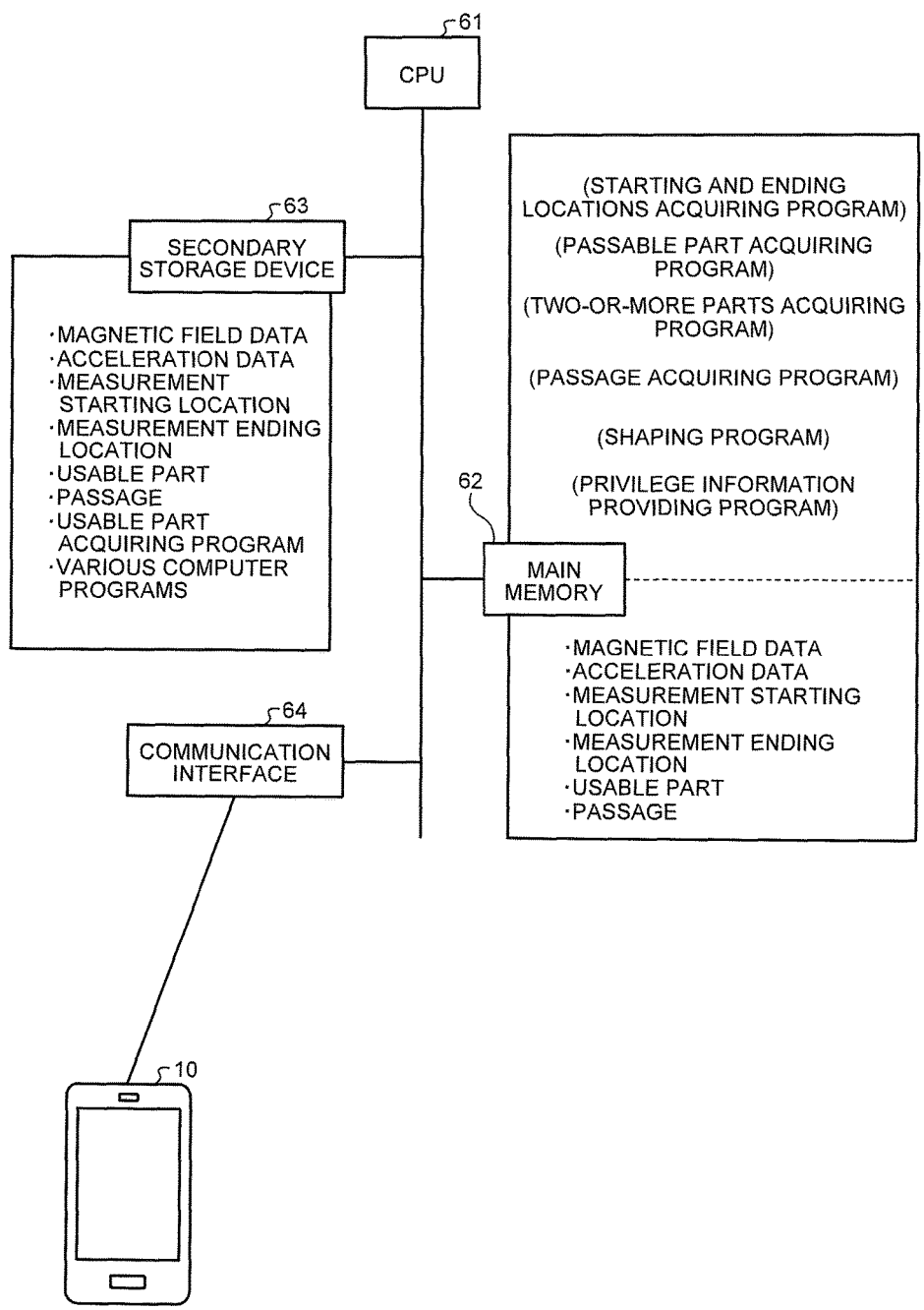
FIG. 6 is a schematic diagram illustrating an example of hardware components of an information processing apparatus in Embodiment.

FIG. 6 is a schematic diagram representing an example of the composition of the information processing apparatus obtained when the above functional components are implemented as hardware. Here, the server apparatus 20 in particular is taken as an example in describing how hardware components therein work.

As this diagram illustrates, the server apparatus includes components such as a CPU 61 for executing various kinds of arithmetic processing, a main memory 62, a secondary storage device 63, and a communication interface 64. The secondary storage device has various kinds of data and various computer programs stored therein. The various kinds of data include magnetic field data and acceleration data that have been output from the user terminal 10 in which corresponding pieces are associated with each other. The various computer programs include a starting and ending locations acquiring program. The CPU loads each of these various computer programs onto the main memory to execute the computer program. The above individual hardware components are connected to one another via a data communication path such as a system bus, thereby transmitting and receiving information to and from one another and processing information.

At the start, the CPU executes the starting and ending locations acquiring program to read out a measurement starting location and a measurement ending location that have been stored. The CPU then executes a passable part acquiring program to sequentially read out data such as acceleration data acquired during movement from the measurement starting location to the measurement ending location and then acquire, based on the data, a cluster of pieces of information on locations along the movement. The CPU then acquires, as a passable part, a line obtained by connecting the acquired locations. The acquired passable part is stored in the secondary storage device.

The CPU further executes a two-or-more parts acquiring program to search the secondary storage device to find whether another passable part located at a place near the passable part acquired by the passable part acquiring program has been stored therein. If a search result indicating that there is another such passable part is obtained, the CPU acquires this passable part. The CPU then executes a passage acquiring program to execute arithmetic and other processing for averaging the passable parts, thereby acquiring a single passage. The CPU may further execute a shaping program to perform processing for shaping the passage acquired.

The CPU also executes a privilege information acquiring program to perform aggregate calculations on data such as acceleration data associated with one user terminal, refer to a table or the like in which aggregate calculation results are associated with corresponding pieces of the privilege information, and acquires a piece of the privilege information for the user terminal. The CPU may further execute processing for transmitting, to the user terminal, the acquired piece of the privilege information.

Illustration of hardware components of the user terminal 10 is omitted. The user terminal 10 includes components such as an acceleration sensor, a magnetic field sensor, and a communication circuit in addition to a CPU, a main memory, and a secondary storage device. The user terminal 10 retains various computer programs and executes them as appropriate to output, to the server apparatus 20, acceleration data and magnetic field data corresponding pieces of which are associated with each other.

The aforementioned hardware components are merely one example. Other aspects according to which the user terminal 10 and the server apparatus 20 share the functional components are conceivable. Either of the user terminal 10 or the server apparatus 20 may include hardware components that can implement all of the functional components. This is also applicable to the procedure of processing described below.

3. Procedure of Processing

Figure 7:
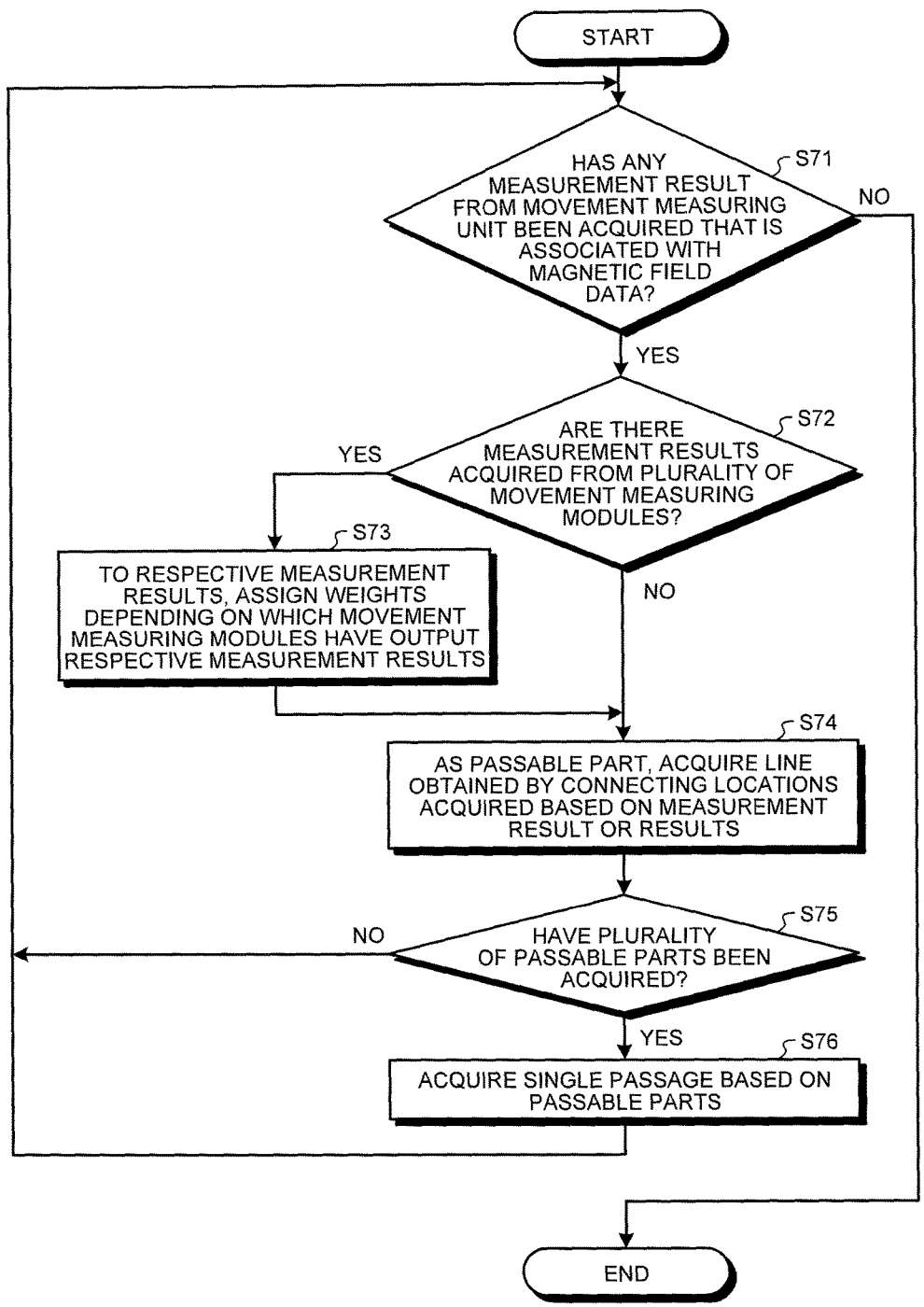
FIG. 7 is a flowchart illustrating an example of the procedure of processing that the information processing apparatus in Embodiment performs.

FIG. 7 is a flowchart illustrating an example of the procedure of processing in the information processing apparatus in this embodiment. The procedure of processing in the server apparatus 20 is described here. Steps described below may be steps to be executed by the respective hardware components of a computer as the one described above, or may be processing steps constituting a computer program stored in a medium and intended to control a computer.

As illustrated, at the start, a determination is made as to whether any measurement result from the movement measuring unit that is associated with magnetic field data has been acquired (S71). The processing ends if the determination result indicates that no such measurement result has been acquired. If the determination result indicates that such measurement result has been acquired, a determination is made as to whether there are such measurement results acquired from a plurality of movement measuring modules (S72). If the determination result indicates that there are such measurement results, weights depending on which movement measuring modules the respective measurement results have been obtained from are assigned to the respective measurement results (S73). On the other hand, if the determination result indicates that there are no such measurement results, the processing for weight assignment is skipped and the procedure proceeds to the subsequent step.

Subsequently, a line obtained by connecting locations acquired based on the measurement result or results is acquired as a passable part (S74). Subsequently, a determination is made as to whether a plurality of such passable parts have been acquired (S75). If the determination result indicates that a plurality of such passable parts have not been acquired, the passable part acquired prior to this step is stored in a certain storage device, and the processing then returns to the processing (S71) for determining whether any measurement result has been acquired. If the determination result indicates that a plurality of such passable parts have been acquired, a single passage is acquired from the passable parts (S76). Subsequently, the acquired single passage is stored in a certain storage device, and the processing then returns to the processing (S71) for determining whether any measurement result has been acquired.

Illustration of the procedure of processing in the user terminal 10 is omitted. Therein, for example, processing for measuring magnetic fields and processing for measuring manners of movement, processing for associating corresponding ones of the measurement results obtained in these two kinds of measurement with each other, and processing for outputting the associated measurement results to the server apparatus 20.

4. Effects

The information processing apparatus in this embodiment is capable of generating map data without advance preparation for the map data, and without using dedicated staff but and with ease and low cost only by having equipment carried around that has the present apparatus installed therein.

5. Other Examples

Figure 9:
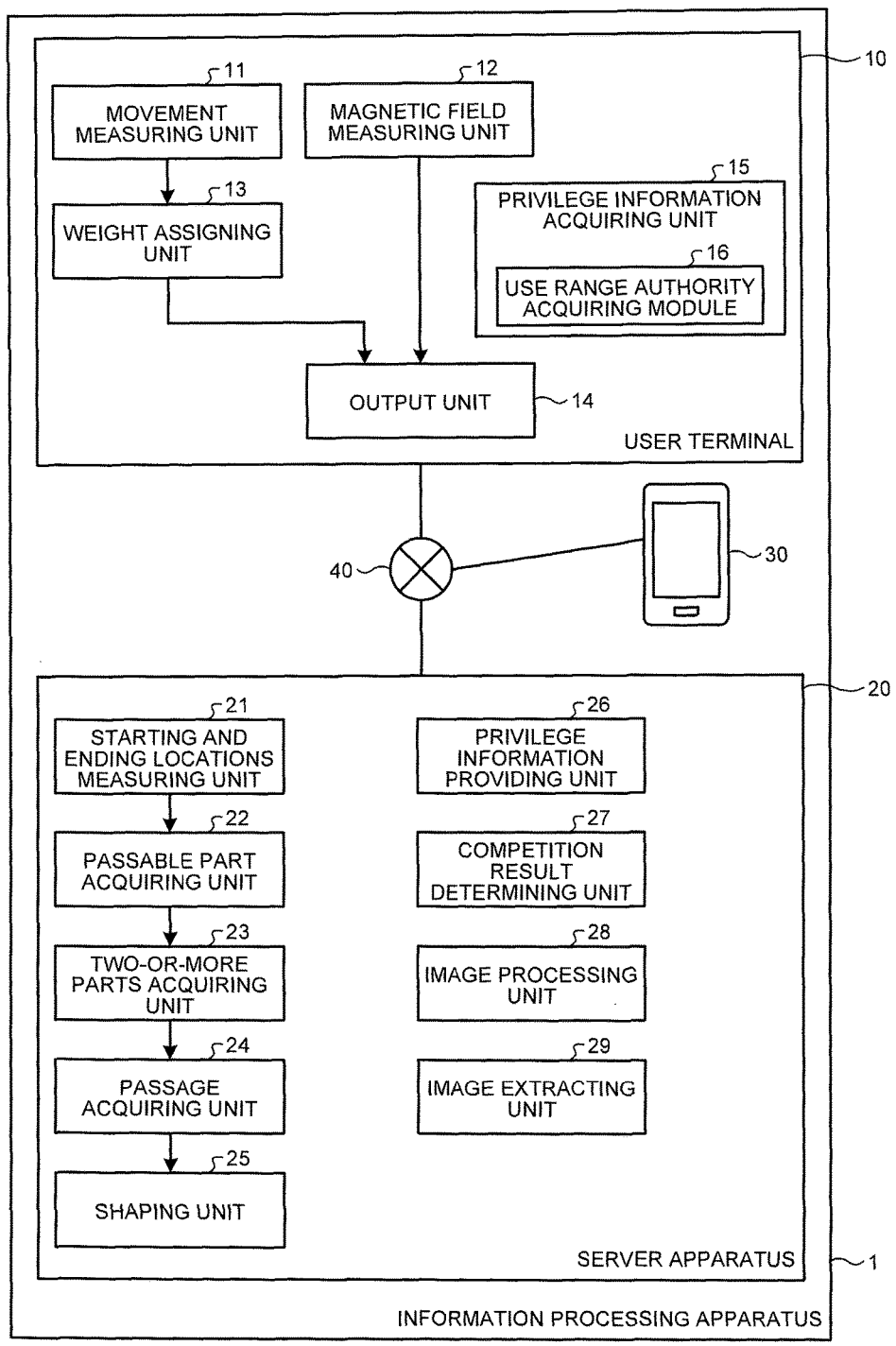
FIG. 9 is a block diagram illustrating another example of functional blocks of the information processing apparatus.
Figure 10:
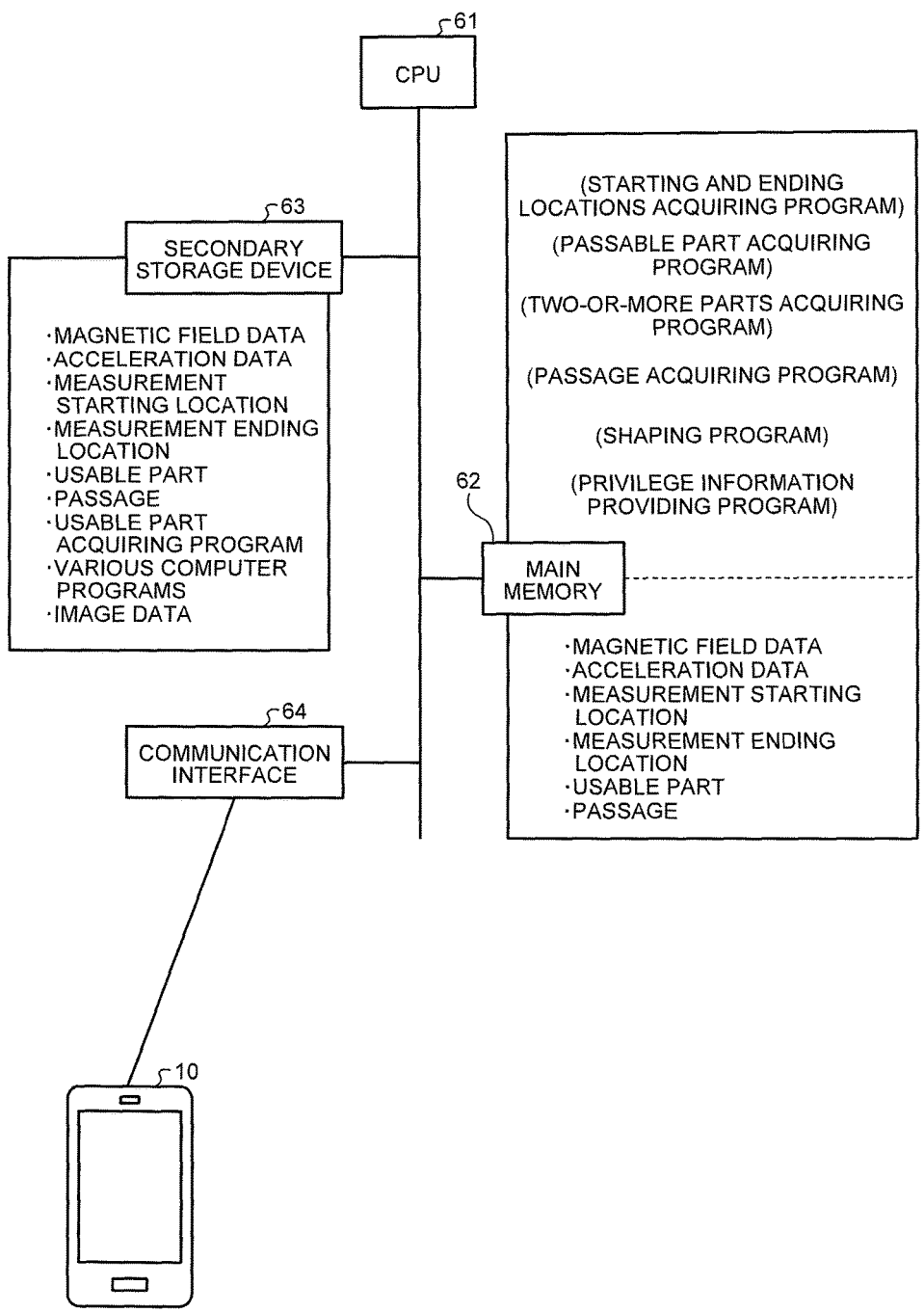
FIG. 10 is a schematic diagram illustrating another example of hardware components of the information processing apparatus.

FIG. 9 is a functional block diagram of an information processing apparatus in another example. FIG. 10 is a conceptual diagram illustrating an example of hardware components of the information processing apparatus in this example. This example is configured in a manner according to the embodiment described by way of the drawings including FIG. 1. Therefore, description of components having the same names is omitted.

The incentive that encourages a general user to perform measuring movement (scanning) is not limited to reward such as privileges, participation in a game or competition that involves movement or a win/loss result thereof. This form of incentive fuels rivalry among users, and causes them to scramble to perform scan, so that the geomagnetic data and the map data can be built and maintained more quickly and more inexpensively.

In this case, for example, the server apparatus 20 includes a competition result determining unit 27 configured to determine, in accordance with measurement results obtained by the movement measuring units in a certain time period, competition results (such as rankings of individual users or teams to which the users belong, win/lose results, or award winners) with respect to a competition (such as a turf war game or a challenge to find and move through a unicursal path with respect to each certain region) involving measurement of a region on which the amount of measurement results is not more than a certain amount (for example, an unscanned region or a region on which the number of times of scanning is low) and with respect to participants.

Optionally, during measuring movement (scanning), images of the surroundings may be captured, and manners of movement, current locations, and surrounding structures such as a wall and a shelf may be specified. Consequently, more highly accurate data can be built up and maintained than in the case of using only physical sensors such as an acceleration sensor.

In this case, for example, the user terminal 10 includes, as another movement measuring unit or in place of the above movement measuring unit, an image capturing module configured to capture images of locations covered by the magnetic field measurement (including images of the surroundings of these locations). Specific examples of the image capturing module include a camera embedded in a smartphone, a tablet PC, or the like. Images to be captured include not only still images but also video imageries.

The server apparatus 20 further includes an image processing unit 28 configured to specify either a manner of movement or a surrounding structure, based on the photographed image. The specification of a manner of movement or a surrounding structure can be implemented by, for example, an image processing technique such as object recognition by which to recognize shapes, such as a plane and a rectangle, that correspond to a wall and a floor the images of which have been captured.

From images of surroundings captured during measuring movement, an image associated with changes in magnetic field that approximate changes in magnetic field that are transmitted from the terminal may be extracted when a service is provided. When the service is provided, the image captured in the past at the same location as the terminal is currently located can be thus easily extracted through comparison between measured and past geomagnetism (magnetic fields), without referring to location coordinates. When an image captured in the past is viewed, past conditions of the same location (such as conditions before a disaster, before development or redevelopment, before a trouble, before a war, or before a climate change, for example) can be grasped, and situations when a person having captured the image of the same location in the past can be grasped.

In this case, the user terminal 10 includes a module configured to store the captured images in association with the magnetic fields. The server apparatus 20 further includes an image extracting unit 29 configured to extract any one of the images that is associated with one of the magnetic fields that coincides with a magnetic field given as a key.

According to the present invention, the need to perform an inefficient operation is eliminated. The inefficient operation includes repeating, with respect to each place, a process of moving after declaring locations (for example, a measurement starting location and a measurement ending location) on map data prepared in advance and thereby collecting geomagnetic data, which is represented by changes in geomagnetism that occur by the moving. Consequently, map data associated with geomagnetic data can be generated without advance preparation for the map data and without using dedicated staff, with ease and low cost, only by causing general people to carry equipment having the present apparatus installed therein, such as a smartphone, while moving.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising:
   a user terminal comprising:
      a magnetic field measuring unit that measures magnetic fields including location-specific magnetic fields;
      a movement measuring unit that measures manners of movement; and
      an output unit that outputs the measured magnetic fields and results of the measurement performed by the movement measuring unit while associating each of the measured magnetic fields and a corresponding one of the measurement results with each other; and
   a server apparatus that generates map data based on the location-specific magnetic fields, the server apparatus comprising:
      a starting and ending locations acquiring unit that acquires a measurement starting location and a measurement ending location which are measured by the movement measuring unit; and
      a passable part acquiring unit that acquires, as a passable part, a line obtained by connecting together locations that have been acquired in the user terminal based on the results of the measurement performed by the movement measuring unit while the user terminal moves from the measurement starting location to the measurement ending location.

2. The information processing system according to claim 1, wherein the movement measuring unit includes an acceleration sensor.

3. The information processing system according to claim 1, wherein the passable part acquiring unit acquires, as the passable part, a certain range obtained with reference to locations that have been acquired in the user terminal based on the results of the measurement performed by the movement measuring unit while the user terminal moves from the measurement starting location to the measurement ending location.

4. The information processing system according to claim 1, wherein the server apparatus further comprises:
   a two-or-more parts acquiring unit that acquires a plurality of such passable parts acquired by the passable part acquiring unit; and
   a passage acquiring unit that acquires a single passage based on the passable parts acquired by the two-or-more parts acquiring unit.

5. The information processing system according to claim 4, wherein the server apparatus further comprises:
   a shaping unit that shapes the passage acquired by the passage acquiring unit.

6. The information processing system according to claim 1, wherein
   the movement measuring unit includes a plurality of movement measuring modules, each measuring a manner of movement.

7. The information processing system according to claim 1, wherein
   the movement measuring unit includes a plurality of movement measuring modules, each measuring a manner of movement,
   the server apparatus further comprises,
   a weight assigning unit that assigns weights to the measurement results obtained from the movement measuring modules included in the movement measuring unit, the weights depending on the respective movement measuring modules; and
   the passable part acquiring unit that acquires the passable part, based on a result of the weight assignment performed by the weight assigning unit.

8. The information processing system according to claim 7, wherein the passage acquiring unit acquires a single passage based on a plurality of passable parts acquired by the passable part acquiring unit.

9. The information processing system according to claim 1, wherein the user terminal further comprises:
   a privilege information acquiring unit that acquires a piece of privilege information in accordance with the results of the measurement performed by the movement measuring unit, the privilege information being pieces of information each regarding a privilege.

10. The information processing system according to claim 9, wherein
    a first piece of the privilege information indicates use range authority over a map which is an output from the output unit obtained by associating the magnetic fields measured by the magnetic field measuring unit with the results of the measurement performed by the movement measuring unit.

11. The information processing system according to claim 1, wherein the server apparatus further comprises:
    a privilege information providing unit that provides a piece of privilege information in accordance with the results of the measurement performed by the movement measuring unit, the privilege information being pieces of information each regarding a privilege.

12. The information processing system according to claim 1, wherein the server apparatus further comprises:
    a competition result determining unit that determines competition results with respect to a competition involving measurement of a region on which the amount of measurement results is not more than a certain amount and with respect to participants of the competition, in accordance with the results of the measurement performed by the movement measuring unit in a certain time period.

13. The information processing system according to claim 1, wherein the user terminal further comprises:
an image capturing module as another movement measuring unit or in place of the above movement measuring unit, the image capturing module capturing images of locations at which the measurement of magnetic fields is performed; and
an image processing unit that specifies, based on the images captured, at least one of the manner of movement and a surrounding structure.

14. The information processing system according to claim 13, wherein the user terminal further comprises a module that stores the images captured in association with corresponding ones of the magnetic fields, and the server apparatus further comprises an image extracting unit that extracts any one of the images that is associated with one of the magnetic fields that coincides with a magnetic field given as a key.

15. The information processing system according to claim 1, wherein the map data identifies the location-specific magnetic fields associated with the passable part.

16. An information processing method implemented by an information processing system including a user terminal and a server apparatus, comprising:
first measuring for measuring magnetic fields including location-specific magnetic fields, by the user terminal;
second measuring for measuring manners of movement, by the user terminal;
outputting the measured magnetic fields and measurement results obtained as the measured manners of movement, while associating each the magnetic fields and a corresponding one of the measurement results with each other, by the user terminal;
generating map data based on the location-specific magnetic fields, by the server apparatus;
acquiring a measurement starting location and a measurement ending location which are measured in the second measuring, by the server apparatus; and
acquiring, as a passable part, a line obtained by connecting together locations acquired in the user terminal based on the results of the measurement in the second measuring while the user terminal moves from the measurement starting location to the measurement ending location, by the server apparatus.

17. The information processing method according to claim 16, further comprising:
acquiring, as the passable part, a certain range obtained with reference to locations acquired in the user terminal based on the results of the measurement performed in the second measuring while the user terminal moves from the measurement starting location to the measurement ending location, by the server apparatus.

18. The information processing method according to claim 16, further comprising:
acquiring a plurality of passable parts each being the passable part acquired in the acquiring of the passable part, by the server apparatus; and
acquiring a single passage based on the passable parts acquired in the acquiring of the plurality of passable parts, by the server apparatus.

19. A non-transitory computer readable storage medium having stored therein a program causing a user terminal to execute a process comprising:
first measuring for measuring magnetic fields including location-specific magnetic fields;
second measuring for measuring manners of movement;
acquiring a piece of privilege information in accordance with the results of the second measuring, the privilege information being pieces of information each regarding a privilege; and
outputting the measured magnetic fields and measurement results obtained as the measured manners of movement to a server apparatus, while associating each the magnetic fields and a corresponding one of the measurement results with each other to enable the server apparatus to generate map data based on the location-specific magnetic fields.

20. The non-transitory computer readable storage medium of claim 19, wherein the privilege information is to provide access to a navigation service to the user terminal.

* * * * *